Patented Oct. 1, 1946

2,408,682

UNITED STATES PATENT OFFICE 2,408,682

ADHERING OF POLYVINYL ALCOHOL COMPOSITIONS TO OTHER MATERIALS

Charles Arthur Porter, Nutley, N. J., assignor to Resistoflex Corporation, Belleville, N. J., a corporation of New York No Drawing. Application December 28, 1944, Serial No. 570,222

12 Claims. (Cl. 154—139)

This invention relates to the adhering of polyvinyl alcohol compositions to other materials, more particularly to fibrous materials.

In the making of a wide variety of mechanical goods from polyvinyl alcohol compositions, it is frequently necessary or desirable to laminate the plastic composition with one or more layers of fibrous material, such as textile fabric or paper, or to incorporate in the material strengthening members in the form of cords or threads of natural or synthetic fiber, or inserts of fiberboard and the like.

It is particularly desirable that there be a firm bond and strong adhesion between the polyvinyl alcohol composition and the fibrous reinforcement, especially in those cases where the product is subjected to flexing. One of the difficulties heretofore encountered has been insufficient adhesion with the result that in use the plastic composition has separated from its reinforcing members.

Laminated sheets of reinforced polyvinyl alcohol compositions may be made by placing alternate layers of the plastic and fibrous reinforcement in a mold and subjecting them to heat and pressure. In order to obtain the proper adhesion of the layers to one another, it has heretofore been necessary to control the pressure and temperature within close limits, slight deviations therein resulting in imperfect adhesion. Another difficulty has been breakage of the reinforcing layers such as textile fabric and paper during molding, due apparently to high friction between the polyvinyl alcohol composition and the fabric layer during the application of the molding pressure which causes a certain amount of flow of the plastic relative to the reinforcement.

The objects of the present invention are generally to improve the adhesion between fibrous materials and polyvinyl alcohol compositions, to enable the securing of more perfect adhesion through a wider range of pressures and temperatures, to eliminate breakage of reinforcing layers during molding, and to produce more perfect products.

The present invention resides in the discovery that greatly improved results are obtained if the fibrous material is subjected, preliminary to the bonding operation, to the action of a dilute aqueous solution of a linear ethylene amine having the formula $$H_2N(-CH_2.CH_2.NH)_n-H$$

wherein $n$ is a whole number of 4 or less. The compounds comprised within this definition are ethylene diamine, diethylene triamine, triethylene tetramine, and tetraethylene pentamine. These materials are preferably used as aqueous solutions in concentrations of from about 5% to 15%. The best range of concentration appears to be between about 5% and about 7%.

The textile or other fibrous material may be immersed in the solution until it is thoroughly wetted, removed and dried at room temperature to the point where it is just slightly damp and then laminated with the polyvinyl alcohol composition and bonded thereto in the usual way with heat and pressure. Wetting can be accelerated by the use of wetting agents and may be accomplished by brushing or spraying as well as by dipping. By not completely drying the layer of reinforcement, or by moistening it slightly if it has been completely dried, the adhering to it of the adjacent layer of polyvinyl alcohol composition during molding is facilitated.

The present invention appears to improve and facilitate the adhesion of polyvinyl alcohol compositions to all types of fibrous material, including natural fibers of animal or vegetable origin as well as synthetic fibers such as rayon. The fibrous material may be in the form of threads, cords, textile fabrics, paper, cardboard, fiberboard and the like manufactured products, or in the form of a natural product such as wood or leather.

The term polyvinyl alcohol, as used herein, includes, in addition to pure polyvinyl alcohol, which may be of different degrees of polymerization, all of the water-soluble products resulting from the partial hydrolysis of polyvinyl esters and water-soluble partial derivatives of polyvinyl alcohol however formed. Polyvinyl alcohol is usually made by the partial or complete hydrolysis of polyvinyl acetate and the commercially available varieties vary in their degree of hydrolysis, as indicated by the percentage of ester saponified or by a saponification number, as well as in their viscosities in solution. The invention has been found to be applicable to all types of polyvinyl alcohol, as herein defined.

The following specific examples will illustrate the invention and show the advantages to be derived therefrom:

EXAMPLE 1

A six inch square of muslin was soaked in a 7% aqueous solution of tetraethylene pentamine for about 1 minute and dried at room temperature until it retained only a slight dampness. The thus treated fabric was used as an interlayer between two milled sheets of polyvinyl alcohol composition about 1/32" thick, produced by the method disclosed in U. S. Patent No. 2,177,612 from the following ingredients, the proportions being expressed as parts by weight:

| | |
|---|---|
| Polyvinyl alcohol (91–94% saponified medium viscosity) | 100 |
| Glycerol | 35 |
| Formamide | 7 |
| Water | 36 |

The assembly of textile and milled sheets was placed in an open mold in a platen press, heated to 260° F. in four minutes, then subjected to a pressure of 250 lbs. per sq. in. and cooled immediately while still under pressure.

The adhesion of the polyvinyl alcohol composition to the textile was excellent and the textile was not damaged in any way. Carrying out the above procedure in exactly the same way except that the treatment of the fabric prior to laminating was omitted, very poor adhesion was obtained. In repeating the latter procedure with an increase in the temperature and pressure in an attempt to improve the adhesion, the fabric interlayer was ruptured in places during molding.

EXAMPLE 2

While treatment of the surface to be adhered to the polyvinyl alcohol composition with the linear ethylene amines of the invention has been found to improve the adhesion of such compositions made with any grade of polyvinyl alcohol, it has been found to produce the best results with compositions made from those grades of polyvinyl alcohol which are soluble in cold water, for example the grade which is 85–88% saponified and has a high viscosity. To take advantage of this discovery when molding articles comprising other grades of polyvinyl alcohol, thin intermediate layers of compositions made with the cold-water-soluble types of polyvinyl alcohol may be used. Milled sheets of the following compositions were prepared, parts by weight:

*Composition A*

| | |
|---|---|
| Polyvinyl alcohol (85–88% saponified, high viscosity) | 100 |
| Glycerol | 40 |
| Formamide | 20 |
| Water | 10 |

*Composition B*

| | |
|---|---|
| Polyvinyl alcohol (at least 98.5% saponified, medium viscosity) | 100 |
| Glycerol | 50 |
| Formamide | 20 |
| Water | 55 |

A six inch square of muslin was soaked in a 5% aqueous solution of triethylene tetramine and dried at room temperature until just slightly moist. It was then placed between two layers of milled sheet (formed as in Example 1) of Composition A and this sandwich was then placed between two layers of similar milled sheet of Composition B. The whole was then molded in an open mold under the conditions described in Example 1. Adhesion to the textile was excellent and there was no damage to the textile.

EXAMPLE 3

Sheets of about 1/32nd of an inch in thickness were milled from a mixture having the following composition, parts being by weight:

| | |
|---|---|
| Polyvinyl alcohol (91–94% saponified, medium viscosity) | 100 |
| Glycerol | 35 |
| Formamide | 10 |
| Water | 40 |

A six inch square of kraft paper was soaked in a 7% aqueous solution of tetraethylene pentamine until thoroughly wetted. The paper was dried at room temperature until it had only a damp feel to the touch. It was then placed between two pieces of the above milled sheet and exposed to heat and pressure in an open mold, as in Example 1. The adhesion between the paper and the polyvinyl alcohol composition was very good and the paper was not ruptured. When the procedure was repeated in the same manner except that the treatment of the paper with the above mentioned solution was omitted, the adhesion was very poor. An increase of temperature and pressure improved the adhesion somewhat but ruptured the paper in several places.

Moistening the fibrous sheet of fabric or paper with water will somewhat improve the adhesion between it and the polyvinyl alcohol composition under molding conditions but this expedient is not satisfactory as the presence of water tends to produce blister formation during molding and, since it does not decrease the friction between the paper or fabric and the polyvinyl alcohol composition, it does not eliminate the tendency of the pressure to rupture the fibrous sheet. One of the particular advantages of the ethylene amines described herein is their lubricating effect during molding which entirely eliminates rupturing of the reinforcement.

The best results have been obtained from the higher members of the series of ethylene amines described above, namely triethylene tetramine and tetraethylene pentamine and their use is therefore preferred although all of the compounds named have been found to be useful for the stated purposes, the differences being a matter of degree only.

Since the foregoing examples are merely illustrative of the invention, it is to be understood that it may be practiced otherwise than as herein specifically set forth and that the invention is to be construed broadly within the purview of the claims.

What is claimed is:

1. The method of making a composite product comprising polyvinyl alcohol composition and fibrous material in adhering relationship which comprises the steps of treating the fibrous material with a linear ethylene amine having the formula

$$H_2N(-CH_2.CH_2.NH)_n-H$$

in which $n$ is a whole number of 4 or less, and thereafter applying the polyvinyl alcohol composition to the thus treated fibrous material.

2. The method of claim 1 wherein the linear ethylene amine is applied as an aqueous solution and the fibrous material is substantially dried before application of the polyvinyl alcohol composition thereto.

3. The method of claim 1 wherein the application of the polyvinyl alcohol composition to the fibrous material is made by means of heat and pressure.

4. The method of making a composite article comprising fibrous material and polyvinyl alcohol composition comprising the steps of treating said material with a solution of triethylene tetramine, evaporating most of the solvent, associating the thus treated fibrous material with polyvinyl alcohol composition, and applying heat and pressure to adhere said material and composition together.

5. The method of making a composite article comprising fibrous material and polyvinyl alcohol composition comprising the steps of treating said material with a solution of tetraethylene pentamine, evaporating most of the solvent, associating the thus treated fibrous material with polyvinyl alcohol composition, and applying heat and pressure to adhere said material and composition together.

6. The method of forming a composite product comprising fibrous material and polyvinyl alcohol composition which comprises treating said material with an aqueous solution of a linear ethylene amine corresponding to the formula $$H_2N(-CH_2.CH_2.NH)_n-H$$

wherein $n$ is a whole number of 4 or less, evaporating most of the solvent, associating the thus treated material while damp with a composition of cold-water-soluble polyvinyl alcohol, and subjecting the composite to heat and pressure whereby the materials are caused to adhere together.

7. A composite product comprising a layer of fibrous material containing a linear ethylene amine having the formula $$H_2N(-CH_2.CH_2.NH)_n-H$$

wherein $n$ is a whole number of 4 or less, and a layer of polyvinyl alcohol composition, said layers being adhered together.

8. A composite product comprising a layer of fibrous material containing triethylene tetramine, and a layer of polyvinyl alcohol composition, said layers being adhered together.

9. A composite product comprising a layer of fibrous material containing tetraethylene pentamine, and a layer of polyvinyl alcohol composition, said layers being adhered together.

10. A product according to claim 7 in which the fibrous material is textile fabric.

11. A product according to claim 7 in which the fibrous material is paper.

12. A product according to claim 7 in which the polyvinyl alcohol composition is of the cold-water-soluble type.

CHARLES ARTHUR PORTER.